United States Patent
Cheng et al.

(10) Patent No.: US 10,816,071 B2
(45) Date of Patent: Oct. 27, 2020

(54) LOCKING DIFFERENTIAL WITH IN-LINE, IN-PROFILE LOCKING DRIVE MOTOR

(71) Applicant: Zhejiang CFMOTO Power Co., Ltd., Hangzhou, Zhejiang (CN)

(72) Inventors: Fuying Cheng, Hangzhou (CN); Zhenxiang Kuang, Hangzhou (CN)

(73) Assignee: Zhejiang CFMOTO Power Co., Ltd., Hangzhou, Zhejiang (CN)

(*) Notice: Subject to any disclaimer, the term of this patent is extended or adjusted under 35 U.S.C. 154(b) by 0 days.

(21) Appl. No.: 16/039,471

(22) Filed: Jul. 19, 2018

(65) Prior Publication Data
US 2019/0024771 A1    Jan. 24, 2019

(30) Foreign Application Priority Data
Jul. 19, 2017   (CN) .......................... 2017 1 0590811

(51) Int. Cl.
*F16H 48/34*    (2012.01)
*F16H 48/24*    (2006.01)
*F16H 48/08*    (2006.01)
*F16H 48/42*    (2012.01)
*F16H 48/40*    (2012.01)

(52) U.S. Cl.
CPC ............. *F16H 48/34* (2013.01); *F16H 48/08* (2013.01); *F16H 48/24* (2013.01); *F16H 2048/343* (2013.01); *F16H 2048/405* (2013.01); *F16H 2048/423* (2013.01)

(58) Field of Classification Search
CPC .... F16H 48/34; F16H 48/24; F16H 2048/343; F16H 2048/346
See application file for complete search history.

(56) References Cited

U.S. PATENT DOCUMENTS

| | | | | |
|---|---|---|---|---|
| 4,805,472 A * | 2/1989 | Aoki | ...................... | B60K 23/08 180/247 |
| 4,805,486 A | 2/1989 | Hagiwara et al. | | |
| 5,080,640 A * | 1/1992 | Botterill | ................ | F16H 48/295 475/150 |
| 6,176,152 B1 * | 1/2001 | Victoria | .................. | F16H 48/08 475/230 |
| 6,503,167 B1 * | 1/2003 | Sturm | ...................... | F16H 48/22 192/84.6 |
| 2010/0144478 A1 * | 6/2010 | Fan | .......................... | F16H 48/30 475/150 |

* cited by examiner

*Primary Examiner* — Erin D Bishop
(74) *Attorney, Agent, or Firm* — Jeffrey D. Shewchuk; Shewchuk IP Services, LLC

(57) ABSTRACT

A mechanical locking differential includes a drive lock motor supported by the differential housing. The drive lock motor is disposed opposite the input bevel gear assembly, higher than the differential input and the differential outputs. The drive lock motor is coupled to a differential lock with a gear train that includes a worm drive, to output rotational motion on a lock output gear. The lock output gear causes sliding motion of a rack and a rack follower, pressing the differential lock into or out of engagement. The drive lock motor assembly is disposed fully between the right and left extents of the differential.

19 Claims, 5 Drawing Sheets

LOCKING DIFFERENTIAL WITH IN-LINE, IN-PROFILE LOCKING DRIVE MOTOR

CROSS-REFERENCE TO RELATED U.S. APPLICATION(S)

None.

FIELD OF THE INVENTION

The present invention relates to suspension systems in vehicles, and particularly to mechanical locking differentials used in offroad vehicles such as UVs and ATVs.

BACKGROUND OF THE INVENTION

Utility vehicles ("UVs") and all terrain vehicles ("ATVs") are well known for travel over a wide variety of terrains, including over unpaved trails or fields, rocks, etc. Such vehicles are widely used in agriculture and forestry operations, as well as in safety operations such as for rugged mountain crossings. Such vehicles are also widely used for recreational enjoyment in natural, outdoor settings away from pavement.

In many prior art UVs and ATVs, the engine transmits power to the wheels through a drive shaft, a differential, and a drive axle for each wheel. Ordinary differential drive axles of on-road vehicles don't adequately meet requirements of various road conditions and complex working conditions, and differential drive axles of UVs and ATVs are often larger in size. One example of a larger-in-size differential drive axle is shown in U.S. Pat. No. 4,805,486, incorporated by reference. Lighter and more compact options are needed, which can smoothly function in UV and ATV drive lines.

BRIEF SUMMARY OF THE INVENTION

The present invention is a mechanical locking differential which includes a drive lock motor supported by the differential housing. The drive lock motor is disposed opposite the input bevel gear assembly. The drive lock motor assembly is disposed fully between the right and left extents of the differential, so the drive lock motor in no way increases the width of the differential, resulting in a mechanical locking differential which is compact while at the same time leaving the input bevel gear assembly fully accessible. In another aspect, the drive lock motor is disposed higher than the differential input and the differential outputs. In the preferred embodiment, the drive lock motor is coupled to a differential lock with a gear train that includes a worm drive, to output rotational motion on a lock output gear. The lock output gear causes sliding motion of a rack and a rack follower, pressing the differential lock into or out of engagement.

Figure 1:
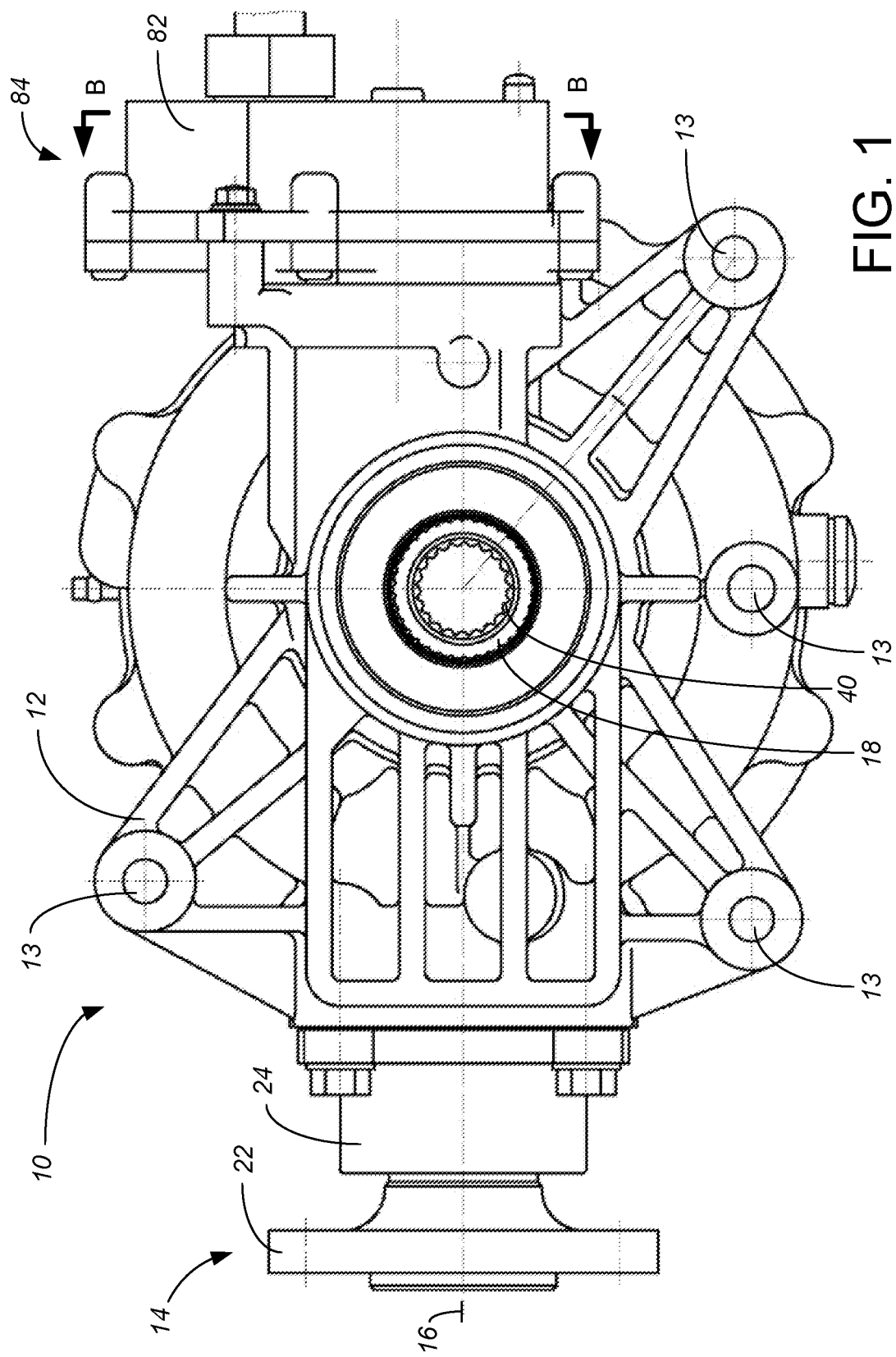
FIG. 1 is a side elevational view showing the structure of the mechanical locking differential provided by a preferred embodiment of the present invention.

In these drawings, the reference numerals are as follows:
differential 10
housing 12
bolt holes 13
input 14
generally longitudinal axis 16
outputs 18
transverse axis 20
flange 22
input bevel assembly 24
input bevel gear 26
ring gear 28
differential case 30
pinion or planetary gear 32
tapered roller bearings 34 for input
semi-axle gears 36, 38
internally splined output collars 40
width w
locking drive motor 42
locking output gear 44
rack 46
rack follower 48
recess 50
locking sleeve 52
locking sleeve teeth 54
differential case teeth 56
tapered roller bearings 58
bevel gear housing 60
double adjustment washer 62
cross-shaft assembly 64
long planetary gear shaft 66
short planetary gear shaft 68
cross shaft sleeve 70
gear train 72
gear pair 74, 76
worm screw 78
worm wheel output gear 80
lock drive housing 82
lock drive assembly 84

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The invention is mechanical locking differential 10 having a housing 12, particularly intended for use on a UV or ATV. The housing 12 includes structure for mounting on the vehicle, such as several bolt holes 13. The mechanical locking differential 10 has an input 14 for rotational power about a generally longitudinal axis 16 on the UV or ATV, with two outputs 18 for rotational power about a generally transverse axis 20 on the UV or ATV. Thus, a flange 22 for an input bevel assembly 24 is open either forward (if the differential 10 is mounted and used as a rear differential driving rear wheels of a vehicle) or rearward (if the differential 10 is mounted and used as a rear differential driving rear wheels of a vehicle). The flange 22 is used to attach the input bevel gear 26 to a drive shaft (not shown) delivering rotational power from the vehicle engine (not shown). Alternative to flange 22, other mechanical linkages can be used to drive the input 14.

While the vehicle is running, torque is transmitted from the input bevel gear 26 to a ring gear 28 fixed to a differential case 30, with at least one pinion or planetary gear 32 positioned therein. The differential case 30 is rotationally supported within the housing 12 by tapered roller bearings 58. Under a normal straight running condition while the left and right wheels are rotating at the same speed, the pinion gear 32 rotates about the transverse axis 20 at the speed of the differential case 30, and side gears or semi-axle gears 36, 38 rotate together about the transverse axis 20 at the speed of the ring gear 28 and differential case 30 to transmit the torque to both axles (not shown) through internally splined output collars 40. Using the internally splined output collars 40, the drive axles (not shown) can be conveniently installed and adjusted, and/or at the same time the constant velocity drive shafts (not shown) can be also conveniently installed.

In the preferred embodiment, the differential housing 12 is wider than the output collars 40, so the width w of the differential housing 12 establishes the right and left extent of the differential 10. Minimizing the width w of the differential 10 is important particularly in UVs and ATVs, as any width of the differential 10 increases the angle of the half shaft movement for any suspension movement, as well as taking away from space available for other vehicle components. Having the differential housing 12 be wider than the output collars 40 helps protect the output collars 40, protecting the moving parts of the differential 10 as the UV or ATV is driven over rocks and other harsh terrain. In other embodiments, the outputs 18, which can be collars, stubs or other structure for connecting to the drive axles or constant velocity drive shafts, can be slightly wider than the width of the differential housing 12, so the width of the outputs 18 establishes the right and left extent of the differential 10.

When a rotational difference is caused between the outputs 18 at the time of turning or cornering of the UV or ATV, the pinion gear 32 rotates around its own axis to correct the rotational difference between the inner and outer wheels. Rotation of the pinion gear 32 about its own axis increases the rotational speed of one of the semi-axle gears 36, 38 about the transverse axis 20 while equally decreasing the rotational speed of the other of the semi-axle gears 36, 38 about the transverse axis 20.

If one of the wheels is caught by mud or suspended airborne, the rotational difference between the left and right wheels will increase more than in mere cornering. The increased rotational different is detected by a control unit (not shown). Then, the control unit activates a locking drive motor 42 to rotate a locking output gear 44. The rotation of the locking output gear 44 is changed into a linear movement, such as by a rack 46 slidably supported by the differential housing 12. Movement of the rack 46 moves a proximal end of a rack follower 48 inward toward the longitudinal axis 16. The distal end of the rack follower 48 engages with a recess 50 in a locking sleeve 52 slidably mounted on the semi-axle gear 36 so it rotates with the semi-axle gear 36. When the sleeve 52 is pushed sufficiently inward toward the longitudinal axis 16, rectangular teeth 54 on the sleeve 52 are pushed into engagement with teeth 56 on the differential case 30, regulating the semi-axle gear 36 so it rotates with the differential case 30. By having semi-axle gear 36 rotate at the same speed as the differential case 30, the other semi-axle gear 38 also rotates at the same speed as the differential case 30, and the differential operation is locked. Thus, in this embodiment the locking sleeve 52 with its teeth 54 constitutes a differential lock for the mechanical locking differential 10.

Figure 2:
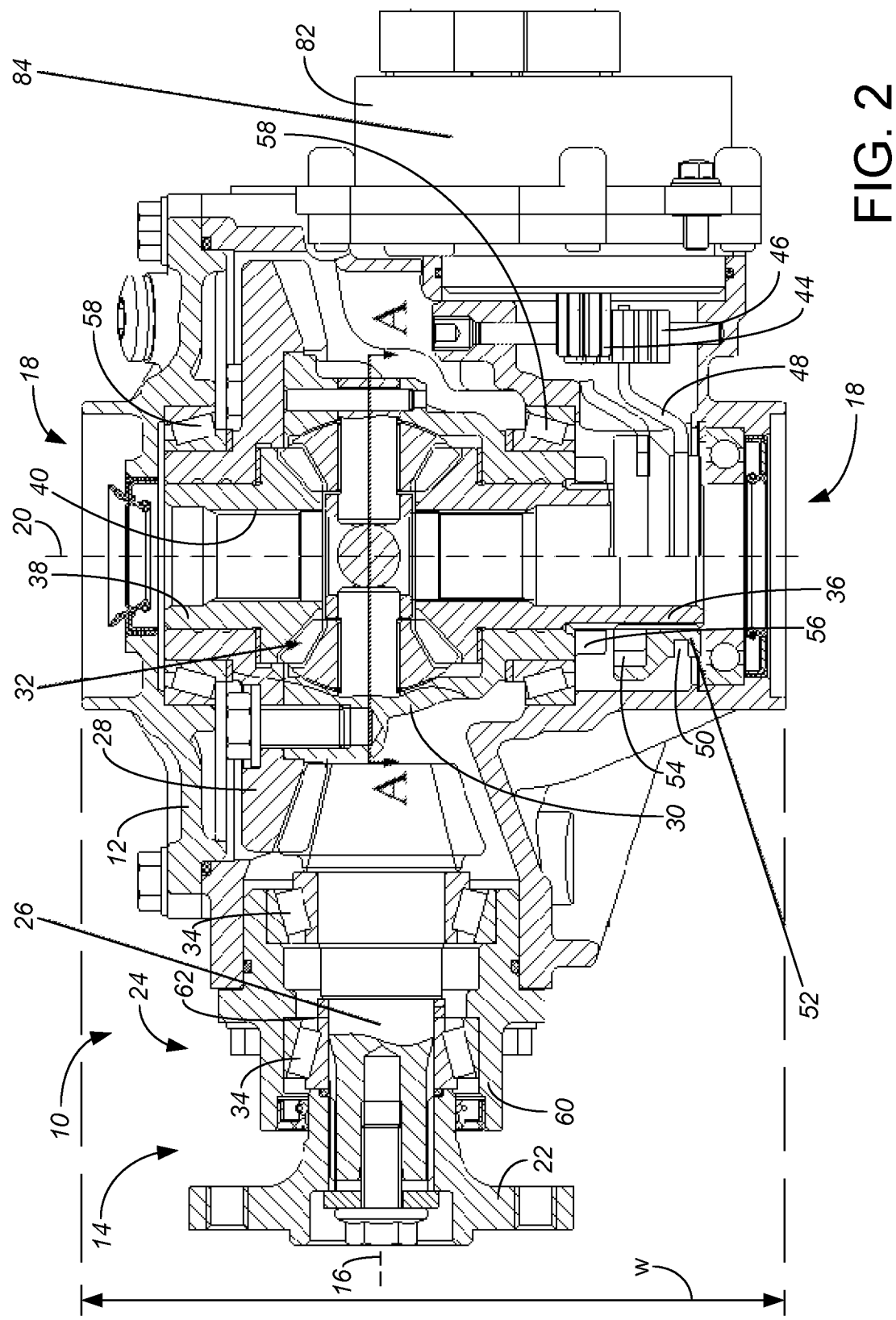
FIG. 2 is a top plan view, substantially in cross-section at the height of the longitudinal axis, of the mechanical locking differential of FIG. 1.
Figure 3:
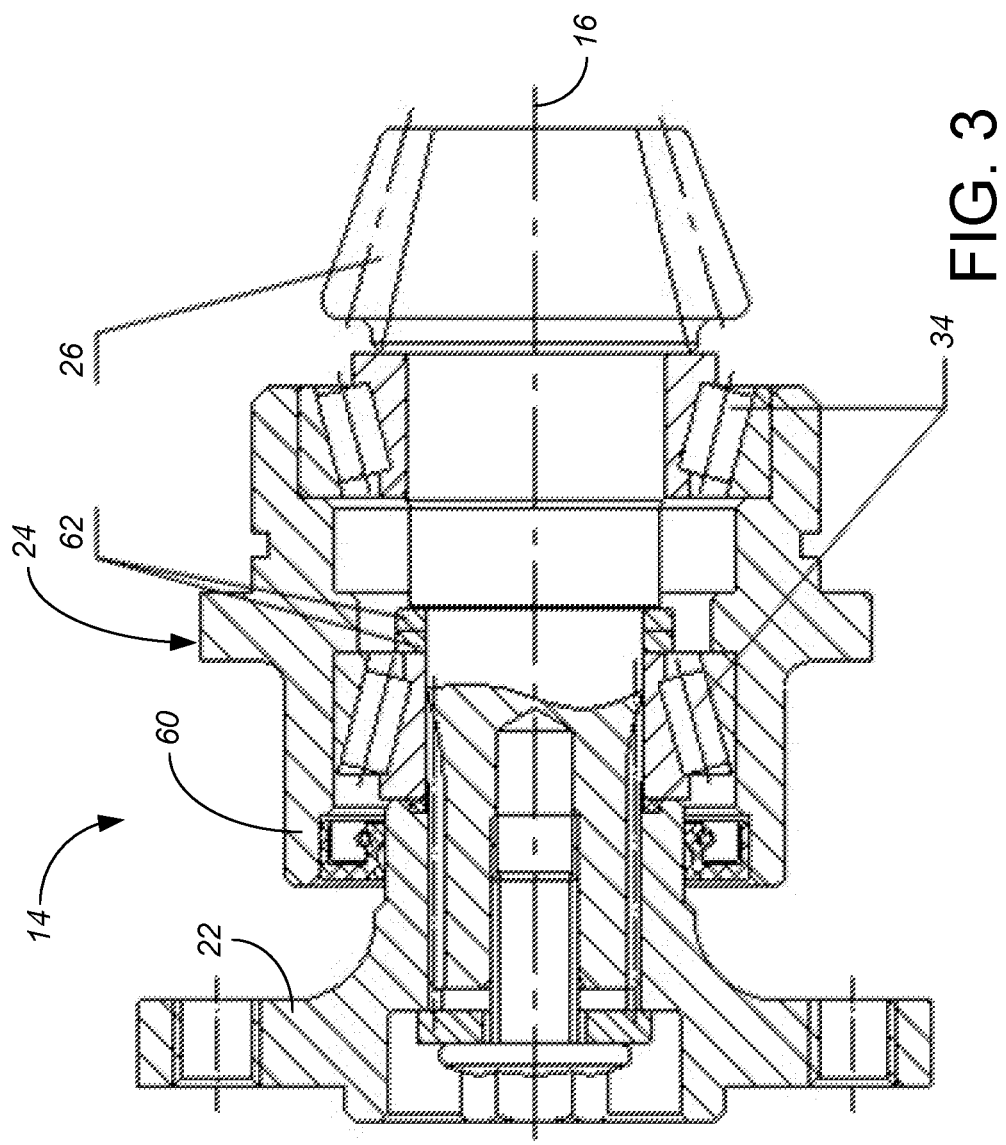
FIG. 3 is a top plan view, substantially in cross-section, of the drive bevel gear input of FIGS. 1 and 2.

In the preferred embodiment, the input assembly 24 is as disclosed in Chinese Patent No. CN2014 20635957.9, incorporated by reference. As shown in FIGS. 2 and 3, the input bevel gear 26 adopts a cantilever structure and is supported by tapered roller bearings 34 to ensure sufficient strength of the driving bevel gear transmission. The bevel gear 26 itself is mounted in a housing 60 split from the housing 12 of the differential 10. The split structure enables the bevel gear 26 with its housing 60 to be used as a universal module 24 to facilitate the design of the drive shaft (not shown), which provides more flexibility for vehicle layout. The input assembly 24 also includes a double adjustment washer 62, which reduces the number of adjustment washers, facilitates adjustment and inspection, and effectively ensures the assembly quality.

Figure 4:
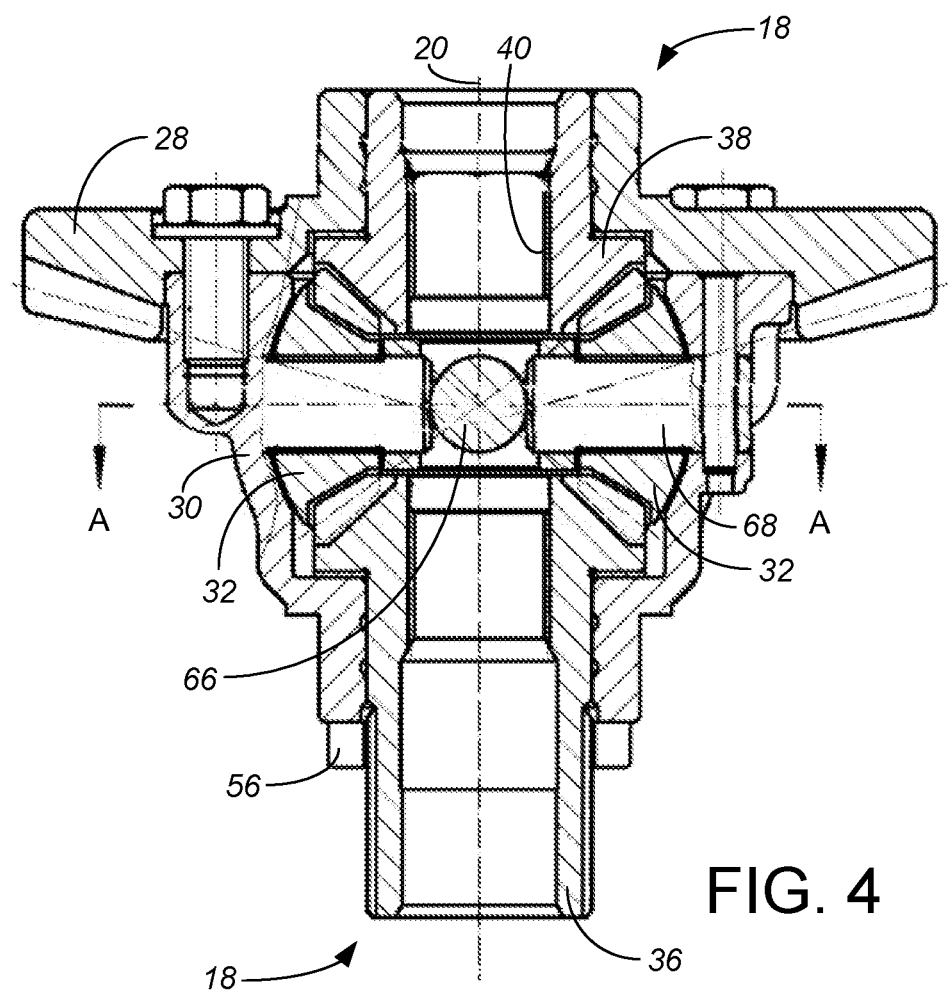
FIG. 4 is a cross-sectional plan view of the differential drive connection.
Figure 5:
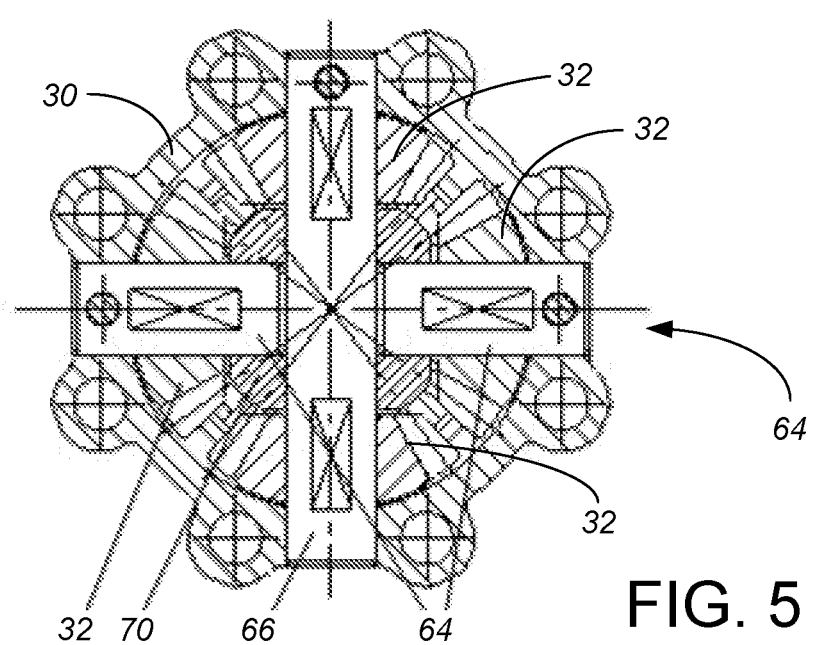
FIG. 5 is a cross-sectional side view of the differential drive connection, taken along lines A-A of FIGS. 2 and 4.

In the preferred embodiment, the drive connection between the differential case 30 and the output semi-axles 36, 38 is as disclosed in Chinese Patent Nos. CN2014 20638485.2, incorporated by reference. The differential 10 thus includes a cross-shaft assembly 64 and four pinion planetary gears 32 as shown in FIG. 4. In the cross-shaft assembly 64, a long planetary gear shaft 66 and a short planetary gear shaft 68 are connected together through a cross shaft sleeve 70 to support the four planetary gears 32 to ensure smooth operation and ensure sufficient transmission strength, while minimizing volume and weight of the differential 10.

In the preferred embodiment, the locking sleeve 52 is as disclosed in Chinese Patent Nos. CN2014 20634584.3 and CN2014 20635010.8, both incorporated by reference. The locking sleeve 52 ensures sufficient transmission strength, because of the toothed connections between the locking sleeve 52 and the differential case 30 and because of the toothed connection between the locking sleeve 52 and the outer spline of the semi-axle gear 36.

Figure 6:
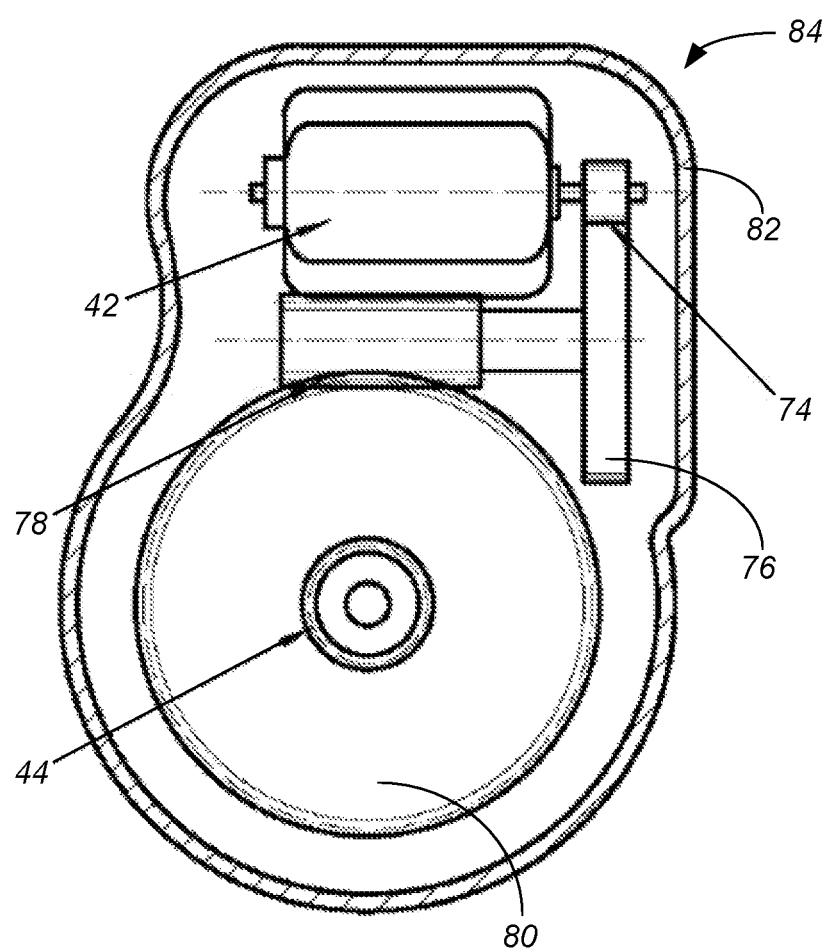
FIG. 6 is a rear elevational view of the drive motor of FIG. 1, in cross-section through the housing and taken along lines B-B of FIG. 1.

The lock drive motor 42 is an electric motor mounted relative to the differential housing 12 as shown in FIG. 6. For instance, the lock drive motor 42 can be coupled to its output gear 44 using a gear train 72. The preferred gear train 72 includes a first gear pair 74, 76 that substantially reduces the output speed of the motor 42 while increasing its torque, and then a worm screw 78 coupled to the worm wheel output gear 80 that even more substantially reduces the output speed of the motor 42 while increasing its torque. For example, the first gear pair 74, 76 can provide a reduction of 4:1 or more, while the worm drive 78, 80 can provide a reduction of 10:1, 20:1 or more. The worm drive 78, 80 also conveniently changes the direction of rotation by 90°. With this significant gear reduction, a very small electric motor 42 can be used for locking the differential 10. For instance, the preferred electric drive motor 42 has a diameter roughly equal to the inner diameter inner toothed output collar 40, and a length shorter than either of the semi-axle output gears 36, 38.

The lock drive motor 42 is mounted within a lock drive housing 82 as part of a lock drive assembly 84, which is located on the differential housing 12 opposite the input bevel gear 26. This mounting position facilitates providing the input bevel gear 26 as its own, separate universal assembly 24, and does not interfere with positioning or access between the input bevel gear 26 and the differential housing 12. The lock drive motor 42 is mounted high in the differential 10, above the longitudinal axis 16 of the input 14 and above the transverse axis 20 of the outputs 18. In this high location, the electric motor 42 is better protected during driving of the UV or ATV. The axis of rotation of the lock drive motor 42 is preferably transverse to the longitudinal direction, meaning the lock drive assembly 84 can be mounted close in to the differential housing 12, reducing the length of the differential 10.

Although the present invention has been described with reference to preferred embodiments, workers skilled in the art will recognize that changes may be made in form and detail without departing from the spirit and scope of the invention.

The invention claimed is:

1. A mechanical locking differential comprising:
a housing for mounting the mechanical locking differential relative to a vehicle;
an input bevel gear supported by the housing and configured for mating with a drive shaft from an engine of a vehicle;
a differential gearset supported by the housing, powered by the input bevel gear, and outputting rotational power on a right output for driving a right wheel of the vehicle and on a left output for driving a left wheel of the vehicle, the right output and the left output rotating about a differential output axis, with the housing having a right output opening around the right output and allowing access to the right output and having a left output opening around the left output and allowing access to the left output, wherein a right plane perpendicular to the differential output axis at the right output opening of the housing establishes a right extent of the mechanical locking differential and a left plane perpendicular to the differential output axis at the left output opening of the housing establishes a left extent of the mechanical locking differential;
a differential lock supported by the housing and mounted relative to the differential gearset, the differential lock when engaged causing the right output to rotate at the identical rotational speed as the left output, each based on the rotational speed of the input bevel gear, the differential lock when disengaged allowing the right output to rotate at a different rotational speed than the left output, collectively based on the rotational speed of the input bevel gear, wherein the differential lock comprises a locking sleeve with teeth; and
a drive lock motor coupled to the differential lock for engaging and disengaging the differential lock, wherein the drive motor is supported by the housing such that the drive motor is disposed on an opposite side of the differential output axis from the input bevel gear and between the left and right extents of the mechanical locking differential.

2. The mechanical locking differential of claim 1, wherein the differential gearset comprises a differential casing, and wherein the mechanical locking differential further comprises a tapered roller bearing supporting the differential casing from the housing.

3. The mechanical locking differential of claim 1, wherein the differential gearset comprises two semi-axle gears, a cross-shaft assembly and four planetary gears.

4. The mechanical locking differential of claim 1, wherein the input bevel gear rotates about a longitudinal axis, and wherein the drive lock motor rotates a shaft about an axis transverse to the longitudinal axis.

5. The mechanical locking differential of claim 1, wherein the drive lock motor is coupled to the differential lock by a gear train, wherein the gear train provides a gear reduction.

6. The mechanical locking differential of claim 5, wherein the gear train comprises a worm drive.

7. The mechanical locking differential of claim 5, wherein the gear train terminates in a drive output gear coupled to a rack.

8. The mechanical locking differential of claim 7, wherein the input bevel gear rotates about a longitudinal axis, and wherein the rack supports a rack follower which is driven toward or away from the longitudinal axis by the drive lock motor.

9. The mechanical locking differential of claim 8, wherein the rack follower mates into a recess of the locking sleeve.

10. The mechanical locking differential of claim 9, wherein the differential gearset comprises a differential casing, wherein at least one of the right and left outputs is a semi-axle gear, and wherein the locking sleeve is slidably mounted on the semi-axle gear, with the rack follower pushing the locking sleeve into or out of engagement with the differential casing.

11. The mechanical locking differential of claim 1, wherein the drive lock motor is supported within a lock drive housing which is fixed to the housing of the mechanical locking differential.

12. An offroad vehicle comprising:
a mechanical locking differential comprising:
a housing mounting the mechanical locking differential relative to the vehicle;
an input bevel gear supported by the housing and configured for mating with a drive shaft from an engine of the vehicle, the input bevel gear rotating about a generally horizontal longitudinal axis;
a differential gearset supported by the housing, powered by the input bevel gear, and outputting rotational power on a right output for driving a right wheel of the vehicle and on a left output for driving a left wheel of the vehicle, the right output and the left output rotating about a differential output axis, with the housing having a right output opening around the right output and allowing access so a right drive axle can connect to the right output and having a left output opening around the left output and allowing access so a left drive axle can connect to the left output, wherein a right vertical plane perpendicular to the differential output axis at the right output opening of the housing establishes a right extent of the mechanical locking differential and a left vertical plane perpendicular to the differential output axis at the left output opening of the housing establishes a left extent of the mechanical locking differential;
a differential lock supported by the housing and mounted relative to the differential gearset, the differential lock when engaged causing the right output to rotate at the identical rotational speed as the left output, each based on the rotational speed of the input bevel gear, the differential lock when disengaged allowing the right output to rotate at a different rotational speed than the left output, collectively based on the rotational speed of the input bevel gear; and
a drive lock motor coupled to the differential lock for engaging and disengaging the differential lock, wherein the drive motor is supported by the housing such that the drive motor is disposed on an opposite side of the differential output axis from the input bevel gear and between the left and right extents of the mechanical locking differential, wherein the drive lock motor is located higher than the longitudinal axis of the input bevel gear in the vertical direction.

13. The vehicle of claim 12, wherein the differential output axis is generally horizontal and extends transversely, and wherein the drive lock motor is located higher than the differential output axis in the vertical direction.

14. The vehicle of claim 12, wherein the drive lock motor is coupled to the differential lock by a gear train, wherein the gear train terminates in a drive output gear coupled to a rack.

15. The vehicle of claim 14, wherein the rack supports a rack follower which is driven toward or away from the longitudinal axis by the drive lock motor.

16. The vehicle of claim 15, wherein the differential lock comprises a locking sleeve, and wherein the rack follower mates into a recess of the locking sleeve.

17. The vehicle of claim 12, wherein the differential lock comprises a locking sleeve with teeth.

18. A mechanical locking differential comprising:
a housing for mounting the mechanical locking differential relative to a vehicle;
an input bevel gear supported by the housing and configured for mating with a drive shaft from an engine of a vehicle, wherein the input bevel gear rotates about a longitudinal axis;
a differential gearset supported by the housing, powered by the input bevel gear, and outputting rotational power on a right output for driving a right wheel of the vehicle and on a left output for driving a left wheel of the vehicle the right output and the left output rotating about a differential output axis;
a differential lock supported by the housing and mounted relative to the differential gearset, the differential lock when engaged causing the right output to rotate at the identical rotational speed as the left output, each based on the rotational speed of the input bevel gear, the differential lock when disengaged allowing the right output to rotate at a different rotational speed than the left output, collectively based on the rotational speed of the input bevel gear, wherein the differential lock comprises a locking sleeve; and a drive lock motor coupled to the differential lock for engaging and disengaging the differential lock, wherein the drive motor is supported by the housing such that the drive motor is disposed on an opposite side of the differential output axis from the input bevel gear, wherein the drive lock motor is coupled to the differential lock by a gear train comprising a worm drive, wherein the worm drive provides a gear reduction, wherein the gear train terminates in a drive output gear coupled to a rack, wherein the rack supports a rack follower which is driven toward or away from the longitudinal axis by the drive lock motor, and wherein the rack follower mates into a recess of the locking sleeve.

19. The mechanical locking differential of claim 18, wherein the differential gearset comprises a differential casing, wherein at least one of the right and left outputs is a semi-axle gear, and wherein the locking sleeve is slidably mounted on the semi-axle gear, with the rack follower pushing the locking sleeve into or out of engagement with the differential casing.

* * * * *